United States Patent [19]

Uemura

[11] Patent Number: 5,252,919

[45] Date of Patent: Oct. 12, 1993

[54] APPARATUS PRODUCING TRAPEZOIDAL WAVEFORMS FROM A PAIR OF MAGNETIC SENSORS FOR DETECTING THE ROTATING ANGLE OF AN OBJECT

[75] Inventor: Saburo Uemura, Yokohama, Japan

[73] Assignee: Macome Corporation, Tokyo, Japan

[21] Appl. No.: 747,292

[22] Filed: Aug. 19, 1991

[30] Foreign Application Priority Data

Mar. 4, 1990 [JP] Japan ................................. 2-37470
Aug. 31, 1990 [JP] Japan ................................. 2-231269
Apr. 25, 1991 [JP] Japan ................................. 3-95620

[51] Int. Cl.$^5$ ........................ G01B 7/30; B25J 19/02; G01R 33/04
[52] U.S. Cl. ................ 324/207.25; 307/261; 324/207.17; 324/253; 328/31; 901/46
[58] Field of Search ............ 324/140, 173, 174, 207.13, 324/207.16-207.22, 207.25, 253, 254; 318/661; 123/617, 350; 137/553; 901/46; 307/261, 268; 328/14, 28, 31; 340/870.31-870.33

[56] References Cited

U.S. PATENT DOCUMENTS

| 3,651,500 | 3/1972 | Weir | 324/173 X |
| 4,161,693 | 7/1979 | Carlson | 324/173 |
| 4,646,011 | 2/1987 | Wallrafen | 324/207.25 |
| 4,788,498 | 11/1988 | Uemura | 324/253 X |
| 4,791,366 | 12/1988 | Suzuki et al. | 324/207.25 |
| 4,857,841 | 8/1989 | Hastings et al. | 324/207.22 X |
| 5,055,781 | 10/1991 | Sakakibara et al. | 324/207.25 X |
| 5,079,468 | 1/1992 | Sata | 324/174 X |

FOREIGN PATENT DOCUMENTS

| 2001368 | 7/1971 | Fed. Rep. of Germany | 324/207.25 |
| 0168913 | 10/1983 | Japan | 324/207.25 |
| 0040813 | 2/1988 | Japan | 324/207.25 |

Primary Examiner—Gerard R. Strecker
Attorney, Agent, or Firm—Bauer & Schaffer

[57] ABSTRACT

A magnetic field generating member is attached to a rotable object the angle of which is to be detected. The apparatus includes first and second magnetic sensors located in the magnetic field generated by the magnetic field generating member, first and second detectors for generating first and second sine wave singles responsive to outputs of the first and second magnetic sensors, first and second limiters for limiting the first and second sine wave signals; and, a synthesizing circuit for synthesizing outputs of the first and second limiter to thereby obtain a synthesized output.

4 Claims, 14 Drawing Sheets

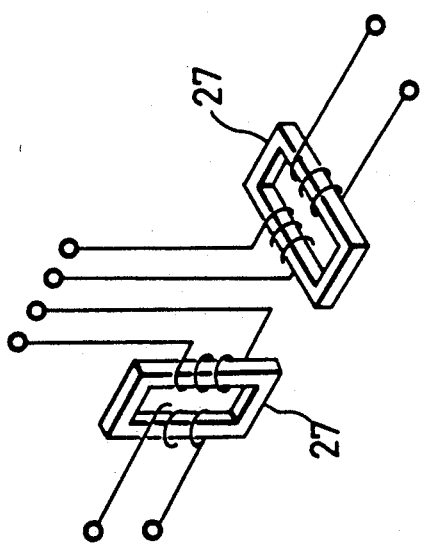
F I G. 10
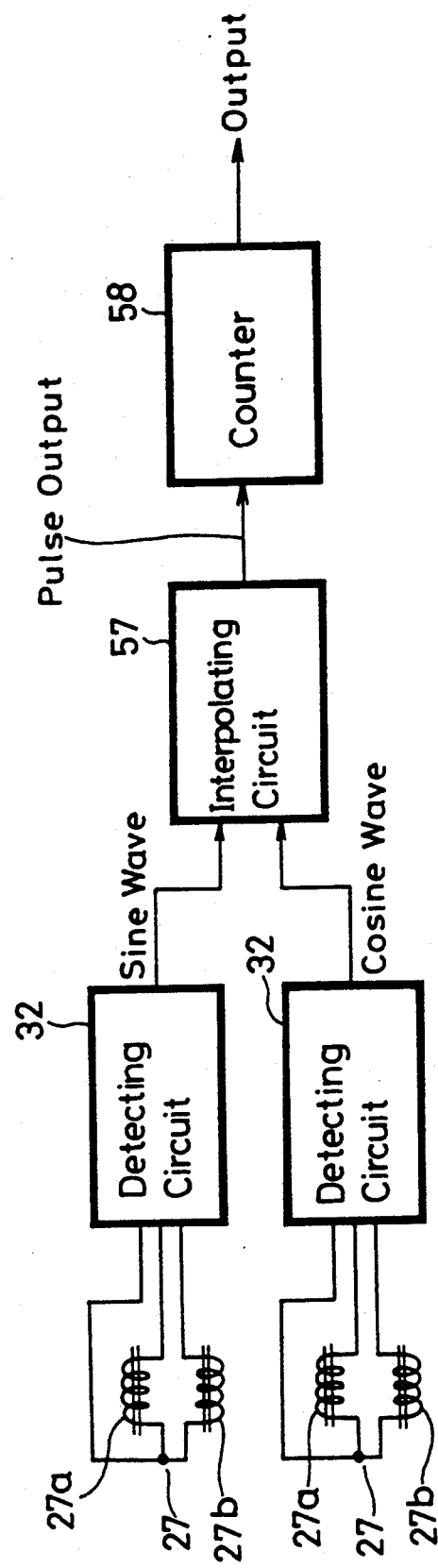
F I G. 11

F I G. 22A
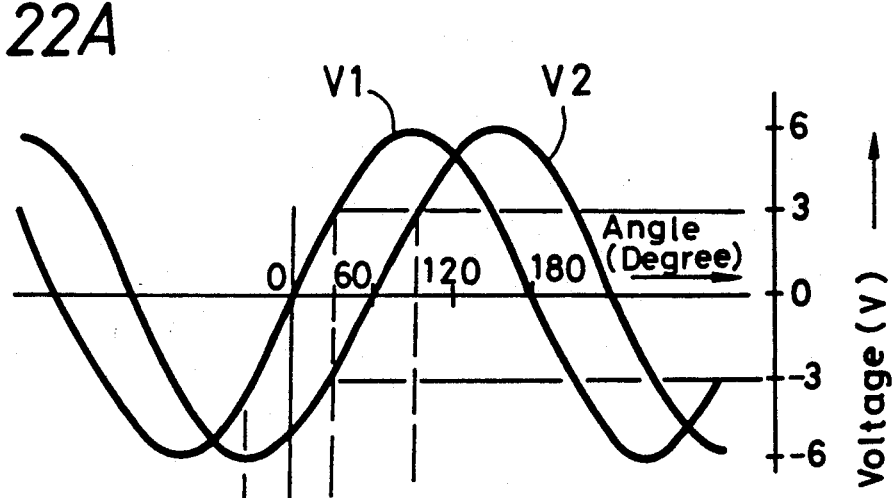
F I G. 22B
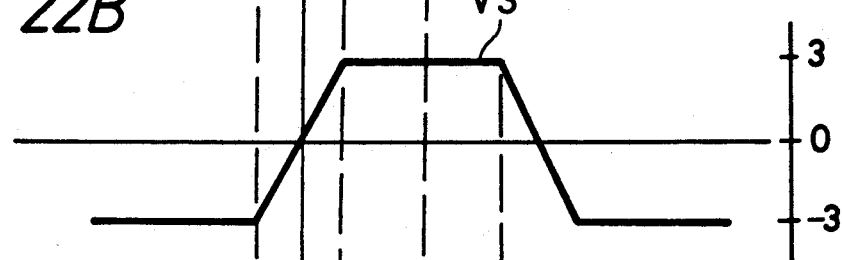
F I G. 22C
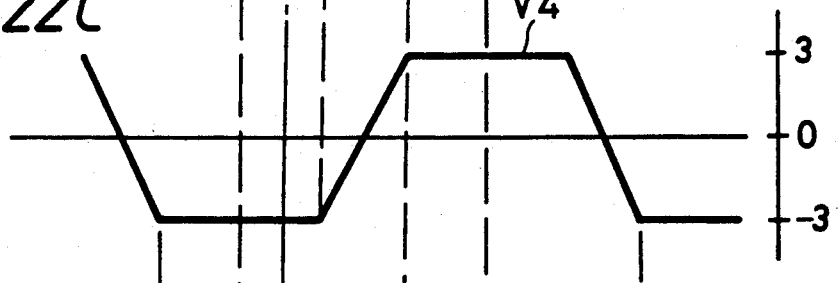
F I G. 22D
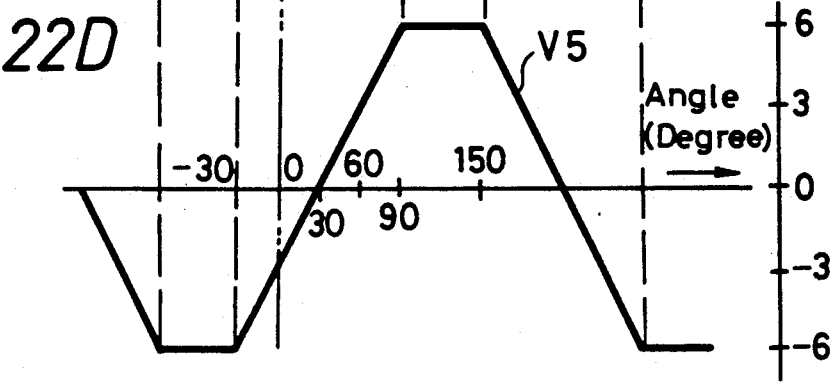

APPARATUS PRODUCING TRAPEZOIDAL WAVEFORMS FROM A PAIR OF MAGNETIC SENSORS FOR DETECTING THE ROTATING ANGLE OF AN OBJECT

FIELD OF THE INVENTION

The present invention relates to angle detecting apparatus and, more particularly, to apparatus which is suitably applied to machines having a rotating joint such as a robot, a crane, a power shovel, a working machine, or an accelerator of an automobile and so on.

DESCRIPTION OF THE PRIOR ART

Apparatus for measuring the rotational angle of an arm of a working robot, a crane, an opening of a valve, and the like have employed a potentiometer—that is, a variable resistor. The conventional potentiometer has, for example, a wound resistor and a mechanically moveable slide member in contact with the resistor winding. On application of a voltage across both terminals of the winding, an electrical signal is produced. When the slide moves in response to a rotatable member, the signal produced corresponds to the rotational angle of the member.

Since this prior art potentiometer is arranged such that the winding and the slide or contact are moved relative to each other, the life cycle thereof is relatively short and connection failures tend to occur under vibrating circumstance. Further problems occur, for example, in petroleum plants or the like, where the current flowing through the resistor member may produce a spark which may lead to a disaster. Therefore, the conventional potentiometer cannot be utilized as the angle detecting apparatus without substantial disadvantage. Further, since a winding is utilized as the resistor member of the potentiometer, the conventional angle detecting apparatus is comparatively low in resolution.

OBJECTS AND SUMMARY OF THE INVENTION

Accordingly, it is an object of the present invention to provide an angle detecting apparatus in which the shortcomings and disadvantages encountered in the prior art can be eliminated.

More specifically, it is an object of the present invention to provide an angle detecting apparatus of non-contact type which is high in reliability and in resolution.

It is another object of the present invention to provide an angle detecting apparatus which can be simplified in arrangement.

It is a further object of the present invention to provide an angle detecting apparatus which can produce a proportional output corresponding to the rotational angle even when the rotational angle is greater than 90° (±45°).

It is yet a further object of the present invention to provide an angle detecting apparatus suitable for detecting a rotational angle in many devices such as an arm of a working robot, an opening of a throttle valve, or the like.

According to the present invention, the angle detecting apparatus comprises a magnetic generating member, producing a magnetic field, a magnetic sensor located in the magnetic field and being rotatable relatively to the generating member, and a detector connected to the magnetic sensor for generating an output signal corresponding to a relative rotation between the magnetic sensor and the magnetic field generating member.

In accordance with the present invention, first and second rotatable magnetic sensors may be located in the magnetic field, having first and second detectors for generating first and second sine wave signals responsive to the outputs corresponding to the relative rotation between the first and second magnetic sensors and the magnetic generator, first and second limiters for limiting the first and second sine wave signals, and a synthesizing circuit for synthesizing the outputs of the first and second limiter are provided so that the relative rotational angle of the magnetic generator is detected by the synthesized output of the synthesizing circuit.

BRIEF DESCRIPTION OF THE DRAWINGS

FIG. 10 is a perspective view illustrating a positional relation between the saturable coils used in the angle detecting apparatus shown in FIG. 9;

FIG. 11 is a block diagram of a circuit which can be applied to the angle detecting apparatus shown in FIG. 9;

FIG. 15 is a characteristic diagram to which references will be made in explaining a relation between a rotational angle of a sensor coil and an output voltage of a detector circuit;

FIGS. 22A through 22D are respectively waveform diagrams of signals produced at respective parts of the angle detecting apparatus of the fifth embodiment of the present invention, and to which references will be made in explaining operation of the fifth embodiment of the present invention.

DETAILED DESCRIPTION OF THE PREFERRED EMBODIMENTS

Figure 1:
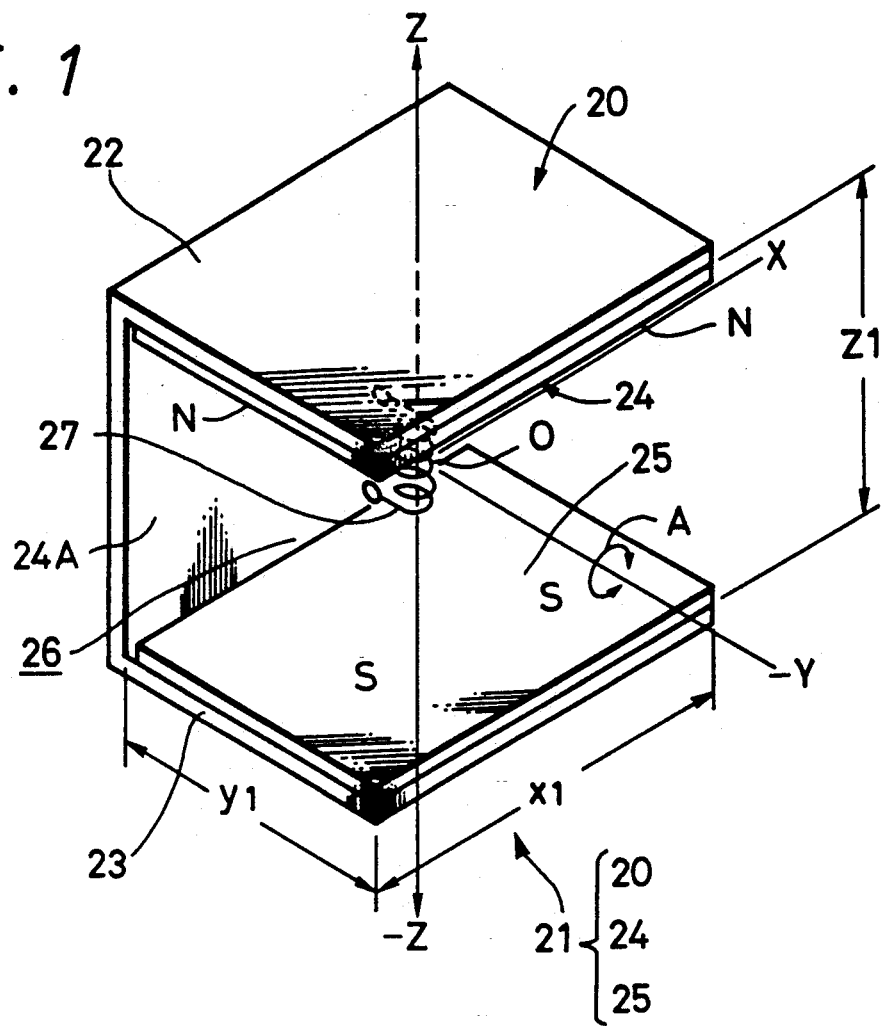
FIG. 1 is a perspective view illustrating an arrangement of a first embodiment of an angle detecting apparatus according to the present invention.

In the present invention, as seen in FIG. 1, the magnetic field generator, generally depicted by the numeral 21, comprises a bent iron channel member 20 acting as a magnetic shielding member against external magnet fields. The channel member is composed of two side surface portions 22, 23 and a bottom surface portion 24A which connects the two sides 22, 23. A pair of magnet plates 24, 25 are bonded to the inner surfaces of the two side surface portions 22, 23 of the channel member 20 such that N and S poles are opposed to each other. The pair of magnet plates 24, 26 functions as a magnetic field generating member 21 within the channel member 20. The material of the channel member 20 is not limited to a magnetic material and may be a non-magnetic material.

Figure 2:
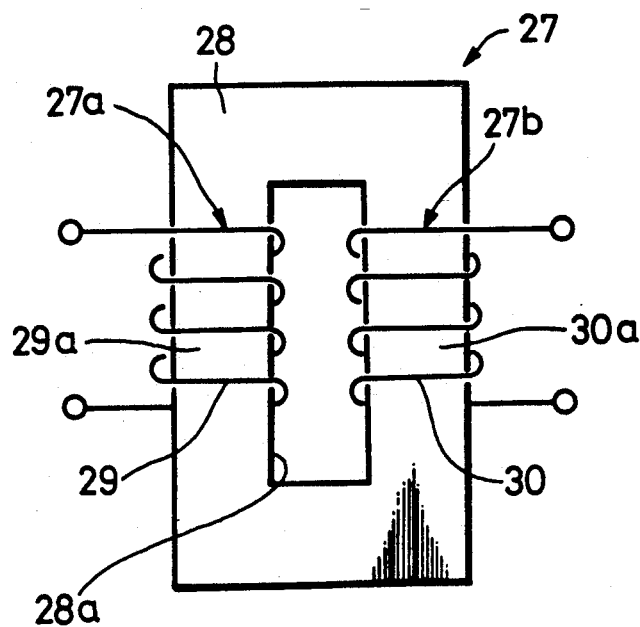
FIG. 2 is a front view illustrating more fully a saturable coil used in the angle detecting apparatus shown in FIG. 1.

In the open space 26 formed in the inside of the channel member 20 is a magnetic sensor 27 which, as shown in FIG. 2, comprises a core 28 and a pair of saturable coil portions 27a and 27b. The core 28 is made of a permalloy thin plate and has a rectangular cutaway portion 28a formed at its center and leg portions 29a, 30a. The coil portions are formed of windings 29, 30, such that the coil 27 is located within the channel member 20 with its plane coincident with the Y-Z plane as seen in FIG. 1 and the longitudinal line portion of the core 28 is coincident with the Z direction.

In FIG. 1 the origin O is selected to be the center point of the space established by a depth y1, a length x1 and an inside width z1 of the interior space 26. The saturable coil 27 is secured within a head holder is mounted to a frame (not shown). The magnetic field generating member 21 as a whole is mounted to a rotating member (not shown) so as to be rotated about the Y axis, relative to the saturable coil 27 in the direction shown by an arrow A in FIG. 1.

Figure 3:
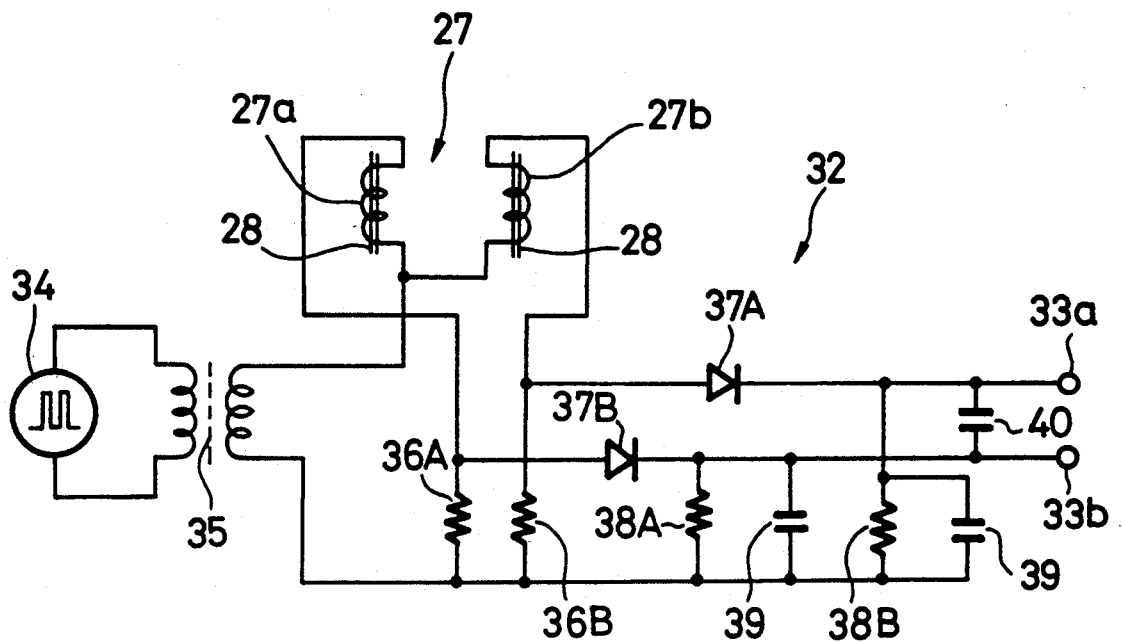
FIG. 3 is a schematic diagram showing a circuit arrangement of a detecting circuit used in the first embodiment of the present invention.

The output terminals of the saturable coil windings 27a, 27b are connected to a detecting circuit 32, shown in FIG. 3, which includes a pulse-shaped voltage oscillator 34 which generates a voltage of a cycle of about 40 microseconds, a pulse width of about 1 microseconds and a voltage amplitude of 30V when supplied with an output voltage of the saturable coil 27. As shown in FIG. 3, the detecting circuit 32 further includes a transformer 35, series resistors 36A, 36B, diodes 37A, 37B, output resistors 38A, 38B, and capacitors 39 and 40, developing an analog voltage output at the output terminals 33a, 33b.

The process by which the analog voltage output is generated is here described more fully. The coil portions 27a, 27b are normally substantially magnetically saturated in the directions opposite to each other by the pulse-shaped current supplied from the transformer 35 in response to the pulse-shaped voltage oscillator 34. Thus, when a DC magnetic field is applied to the core 28, the inductance of one saturable coil portion (e.g. saturable coil portion 27a) is increased, while the inductance of the other saturable coil portion (accordingly, saturable coil portion 27b) is decreased. In response to the change inductances, the pulse-shaped voltages supplied to the anodes of the diodes 37A, 37B are changed, and accordingly, rectifying voltages generated in the output resistors 38A, 38B are also changed. The rectifying voltages are changed in the directions opposite to each other, and a difference between the two rectifying voltages becomes the output from the detecting circuit 32. The detecting circuit 32 is designed so as to generate a voltage of ±6 Volts when a magnetic field of ±50 Gauss is applied to the Z direction of the coil 27. In other words, the saturable coil 27 is highly sensitive to the magnetic field in the Z direction. Further, since the coil 27 is saturated when a magnetic field of ±5000 Gauss is applied to the X direction or Y direction, it is not operated as a saturable coil in both the X and Y directions (i.e. the saturable coil 27 has a low sensitivity in the X and Y direction).

Figure 4:
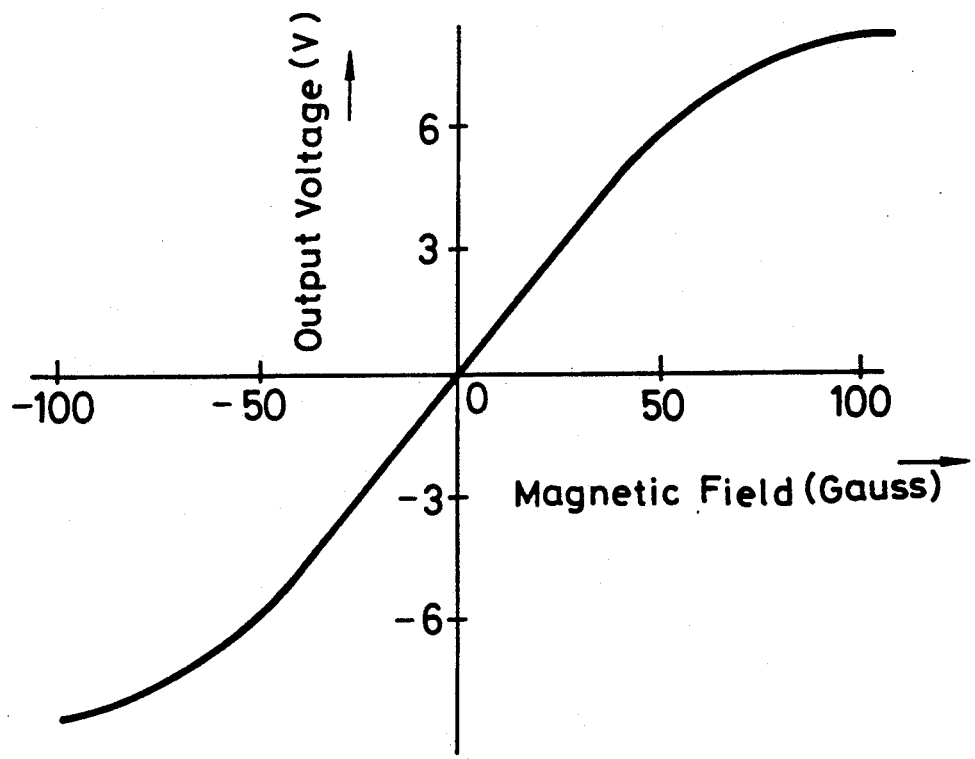
FIG. 4 is a characteristic diagram showing an output characteristic of an output signal from the detecting circuit shown in FIG. 3.

In FIG. 4 the analog output characteristic of the detecting circuit 32, when the magnetic field is applied to the coil 27, is shown in the Z axis. The output voltage increases substantially rectilineally on applying a magnetic field of up to ±50 Gauss, at which the output becomes ±6 Volts. On the application of a higher magnetic field, the coil 27 becomes gradually saturated and the detecting circuit 32 produces a voltage of substantially ±9 Volts on reaching a magnetic field of ±100 Gauss.

As will be described later, when an interpolating circuit and a counter are connected in series to the output terminals of the detecting circuit 32, then it is possible to obtain a digital output in addition to the analog output.

Operation of the first embodiment is described hereinafter.

Referring to FIG. 1, a magnetic flux is generated in the direction parallel to the Z direction at the position near the origin O so that the flux density perpendicular to the XY plane has a substantially constant value. As a consequence, the magnetic fields at the coordinate points on the respective X, Y, and Z axes near the origin 0 become equal to each other in magnitude—that is, the magnetic field on the coordinate point on the X axis and the magnetic field on the coordinate point on the Y axis are equal to each other in magnitude, and the magnetic fields on the coordinate points on the X and Y axes are different from the magnetic field on the coordinate point on the Z axis. Therefore, under the condition were the coil 27 is located parallel to the Z axis, the amount of magnetic flux passing the core 28 is maximized so that a sine wave having a peak voltage is generated at the output terminals 33a, 33b of the detecting circuit 32. However, when the magnetic field generating member 21 is rotated about the Y axis, then the voltage signal of the sine wave is modified at the output terminals 33a, 33b by the angle of rotation. That is, assuming that $\theta$ is the rotational angle of the magnetic field generating member 21, then the detecting circuit 32 generates a signal of sin $\theta$.

According to the first embodiment of the present invention, if the generator 21 is attached to a rotating joint portion of a robot (not shown) or the accelerator of an automobile (not shown) or the like, the detecting circuit 32 will generate an output signal corresponding to the rotating angle of the arm of the work robot or the opening of valve of the accelerator or the like while not in contact therewith. Therefore, as compared with a conventional potentiometer which is formed of a variable resistor, the angle detecting apparatus of the first embodiment can be made high in reliability and in resolution. Since the magnitude of the magnetic field is not changed regardless of the movement of the magnetic field generating member 21 in the X, Y, or Z axis direction, the detected output value does not fluctuate and the angle detecting apparatus of the first embodiment can be stably operated under any vibration circumstances.

Figure 5:
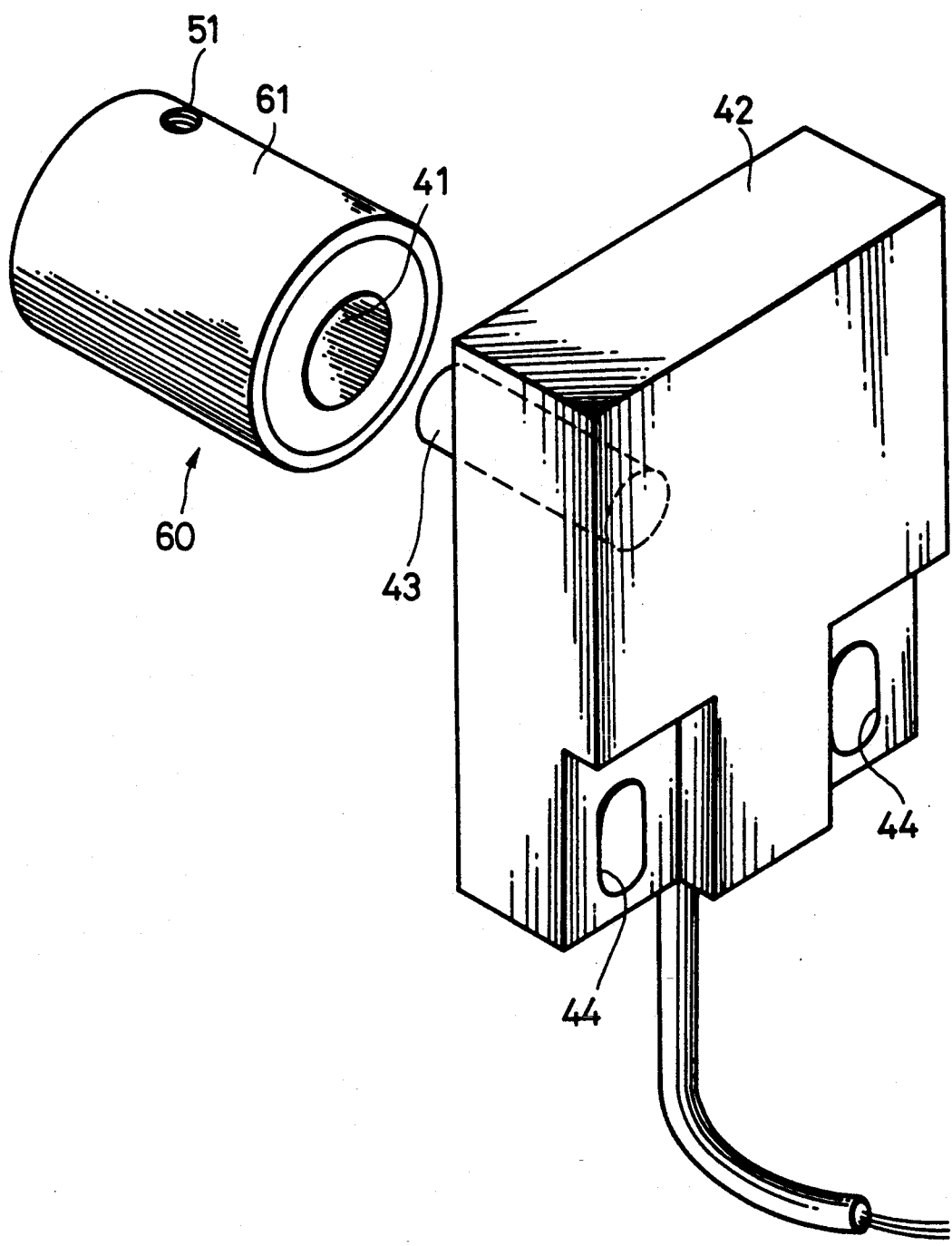
FIG. 5 is a perspective view illustrating an arrangement of a second embodiment of the angle detecting apparatus according to the present invention.

FIG. 5 shows a perspective view of a second embodiment of the angle detecting apparatus according to the present invention.

Referring to FIG. 5, a magnetic field generating member 60 comprises a casing 61 made of iron or material of high magnetic permeability so that it also serves as a magnetic shield. The casing 61 is cylindrical and is about 20 mm in outer diameter and about 25 mm in length. The generating member 60 has an aperture portion 41 of 9 mm in diameter into which a detecting head 43, unitarily secured to a head holder 42, is inserted. The head 42 has apertures 44, 44 bored therethrough and is fastened to a frame 46 by means of screws 45 fitted into the apertures 44, 44 as shown in FIG. 6.

Figure 7:
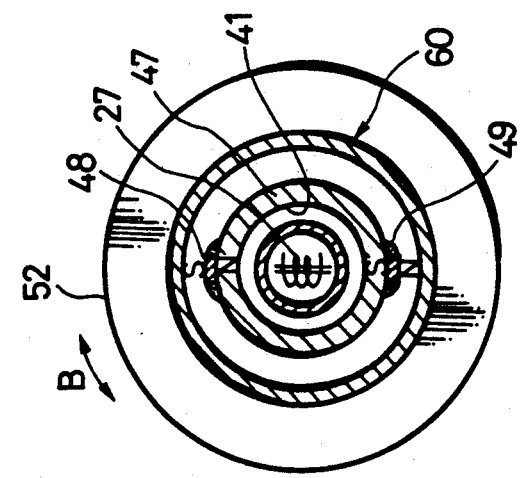
FIG. 7 is a schematic cross sectional view taken through the line E—E of FIG. 6.
Figure 6:
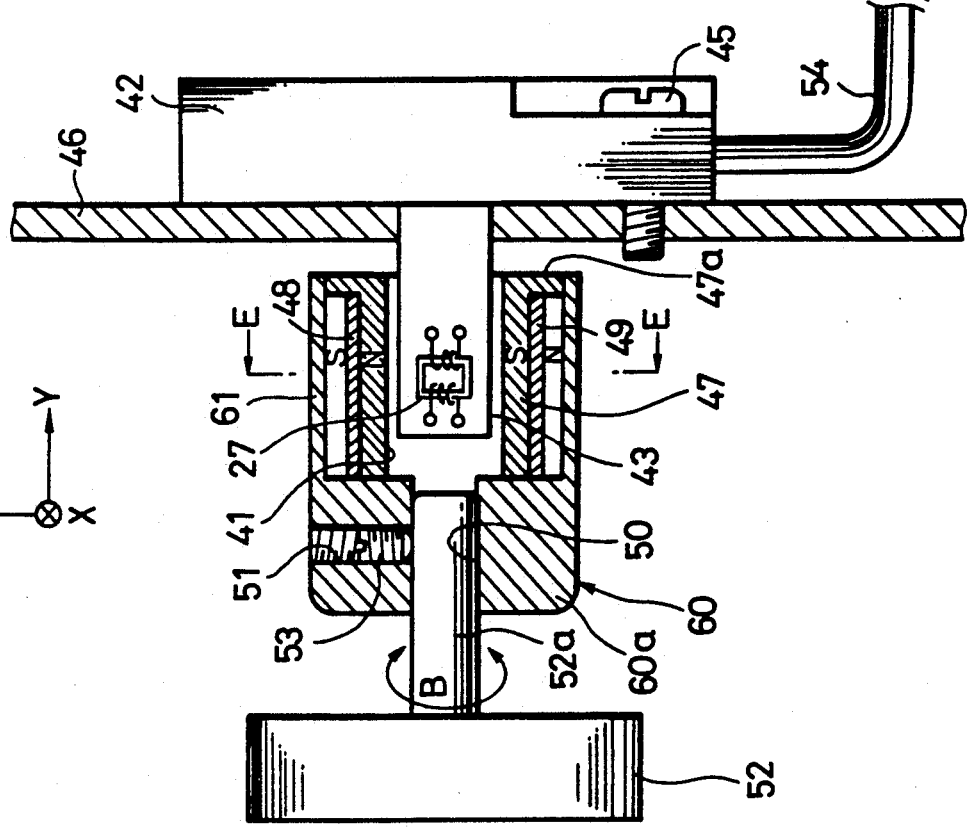
FIG. 6 is a schematic cross sectional view of the angle detecting apparatus shown in FIG. 5 and illustrating the condition such that this angle detecting apparatus is in use.

As will clear from FIG. 6 and FIG. 7, the axial aperture 41 is formed by a sleeve 47 having a flange end 47a which is fitted into the inside of the casing 61. The sleeve 47 is made of a nonmagnetic material, for example, a plastic molding material. A pair of ferrite magnets 48, 49 of solid rectangular configuration are bonded to the outer circumferential surface of the sleeve 47 such that N and S poles thereof are opposed to each other. Each of the ferrite magnets 48, 49 is 2 mm in width, 1 mm in thickness, and 14 mm in length in the depth direction of the aperture 41. The sleeve 47 is bonded to the inner wall of the casing 61 of the magnetic field generating member 60 by some suitable means such as an adhesive agent or the like. The base 60a of the generating member 60 (i.e. the casing 61) has an axial hole 50, of an inner diameter of 5 mm and a threaded screw recess 51 transversely therethrough. As seen in FIG. 6, a shaft 52a fixed to a rotating member 52 is fitted into and secured in the hole 50 by a screw 53. As a result, the rotating member 52 and the generating member 60 are rotated together about the axis of the rotating shaft 52a as shown by the arrow B in FIGS. 6 and 7. The coil 27 serving as the sensor is the same as the coil 27 shown in FIG. 2 and its output terminals are connected to the detecting circuit 32 (see FIG. 3) via a multi-core shielding line 54.

Figure 8:
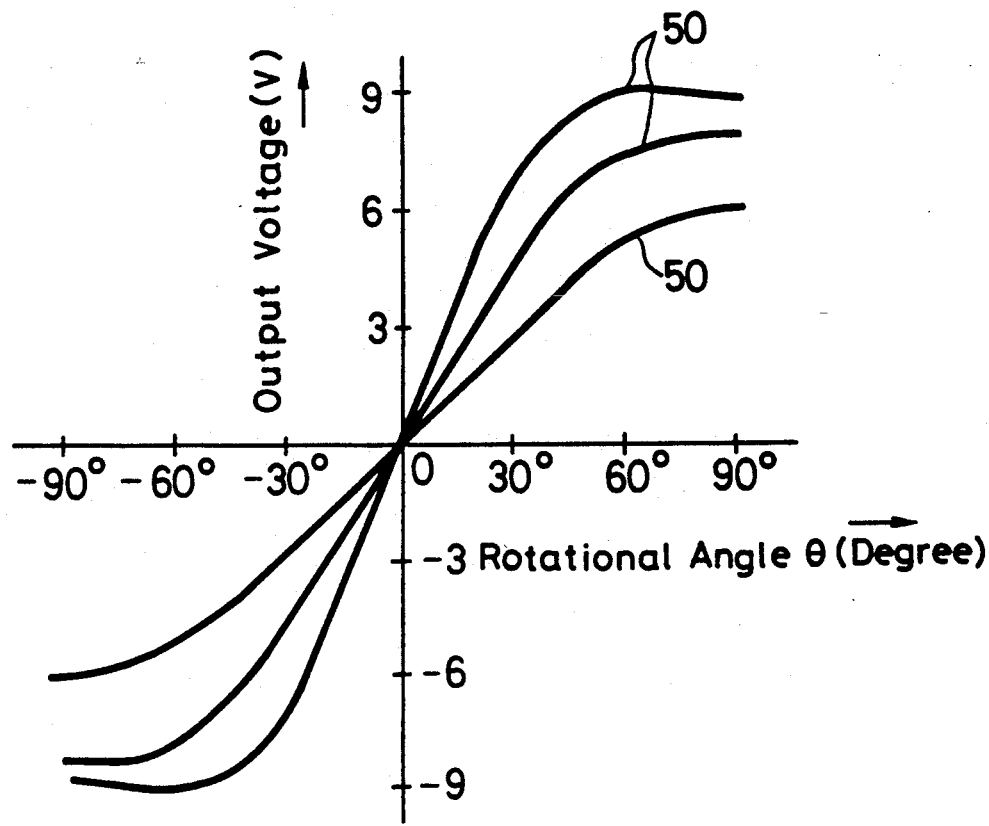
FIG. 8 is a characteristic diagram showing an output characteristic of an output signal from the angle detecting apparatus shown in FIG. 6.

Accordingly, when the generating member 60 is rotated about the axis of its shaft 52a in the arrow B direction (the Y axis), the detecting circuit 32 produces a sine wave output signal relating to the rotating angle $\theta$ of the rotating member 52. As shown in FIG. 8, when the magnitude of the magnetic field in the Z direction does not exceed 50 Gauss, an output voltage is rectilineally generated so long as the rotational angle $\theta$ lies in the range of $\pm 30°$. Therefore, within $\pm 30°$ degrees, the detecting circuit 32 produces an accurate sine wave output corresponding to the rotational angle $\theta$.

It is to be appreciated that the output voltage from the detecting circuit 32 does not change at all even if the rotating member 52 and, consequently, generating member 60 is displaced in the Y or Z direction by a displacement of $\pm 1$ mm. Further, it is to be noted that no change occurred in the output voltage even if the magnetic field generating member 60 is displaced in the X direction by the amount of $\pm 1$ mm because each of the ferrite magnets 48, 49 are 14 mm long. That is, the angle detecting apparatus of the second embodiment is highly stably in operation under any vibrational circumstances.

Figure 9:
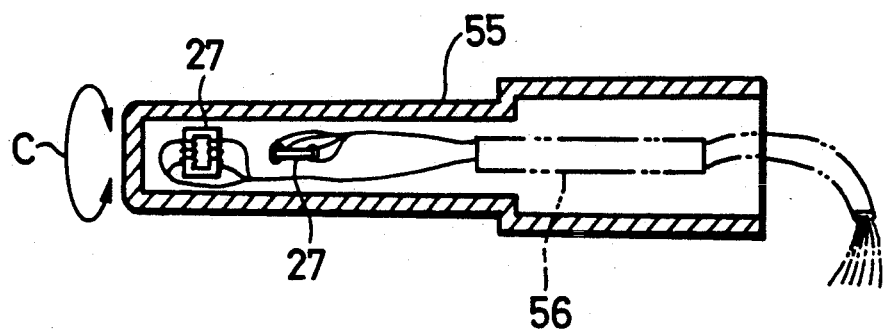
FIG. 9 is a schematic cross sectional view illustrating an arrangement of a third embodiment of the angle detecting apparatus according to the present invention.

FIGS. 9 and 10 illustrate an angle detecting apparatus 55 in which the detecting head, the holder, and the detecting circuit are unitarily formed with each other. This angle detecting apparatus 55 includes two saturable coils 27, 27 which are angularly offset from each other by 90°. Two detecting circuits 32, 32 are located in a housing 56 and are respectively coupled to the saturable coils 27, 27. As seen in FIG. 11, the two detecting circuits 32, 32 produce sine wave and cosine wave signals, respectively, thereby obtaining an analog output signal which covers the full rotational angle, i.e., 360° in which the generating member is rotated in the direction shown by an arrow C in FIG. 9. The detecting circuits 32, 32 are connected with an interpolating circuit 57 and a counter 58 in which the number of interpolated pulses delivered from the interpolating circuit 57 are counted, producing a digital output corresponding to the rotational angle.

As described above, since the field generator and the coil combined as the magnetic sensor can be constructed in an isolated fashion, the apparatus on the rotating shaft of the rotatable member can be measured with ease.

If the pair of magnets are substantially enclosed by a magnetic member, then the magnetic member can be operated as the magnetic shield, thus reducing flux leakage. Moreover, if the coil is utilized as the magnetic sensor, then sensitivity for magnetic flux is enhanced so that a magnet having a small magnetic field can be employed, resulting in greater reduction of magnetic flux leakage.

The angle detecting apparatus incorporating the two magnetic sensors can also be utilized as a resolver.

If the deviation of the rotating member 52 shown in FIG. 6 or the shaft offset amount thereof is large, then a clearance between the rotating member and the outer circumferential surface of the detecting head 43 can be increased by similarly enlarging the members constructing the field generator 60 without changing the output characteristic of the detecting circuit 32.

According to each of the above embodiments, when the magnetic sensor is rotated in the magnetic field, an electrical signal corresponding to its rotational angle is obtained. Then, by detecting this signal in the detecting circuit, an output signal corresponding to the rotational angle is obtained. Thus, the present invention can detect the rotational angle with reliability and with high resolution in a noncontact fashion.

A fourth embodiment of the angle detecting apparatus according to the present invention will now be described with reference to FIGS. 12 through 15.

Figure 12:
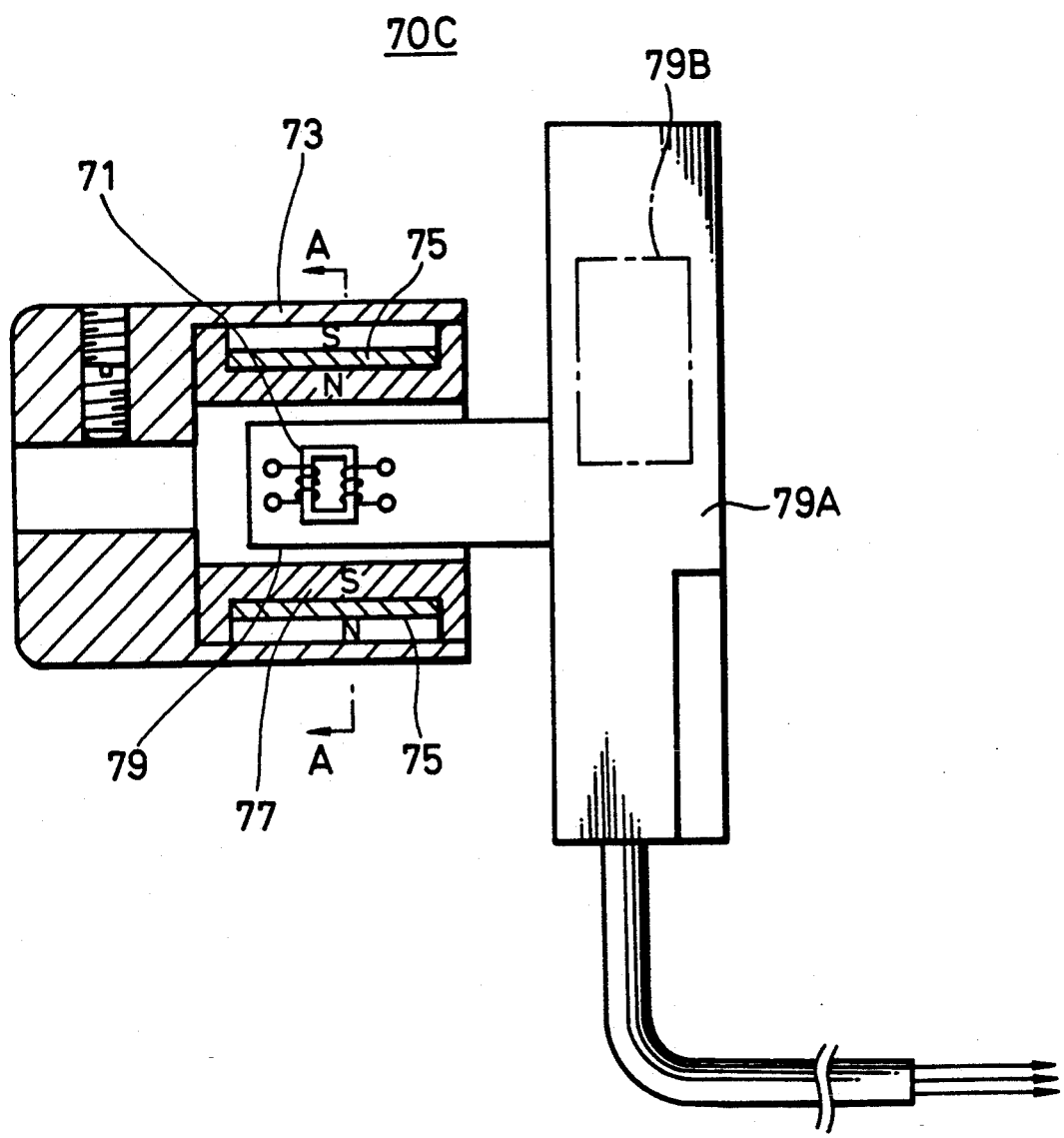
FIG. 12 is a side view illustrating an arrangement of a fourth embodiment of the angle detecting apparatus according to the present invention in a partly cross sectional fashion.
Figure 13:
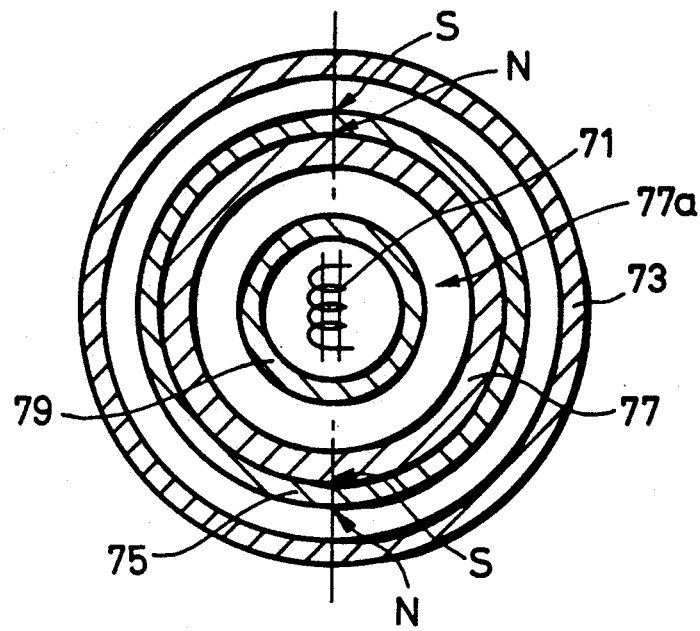
Figure 14:
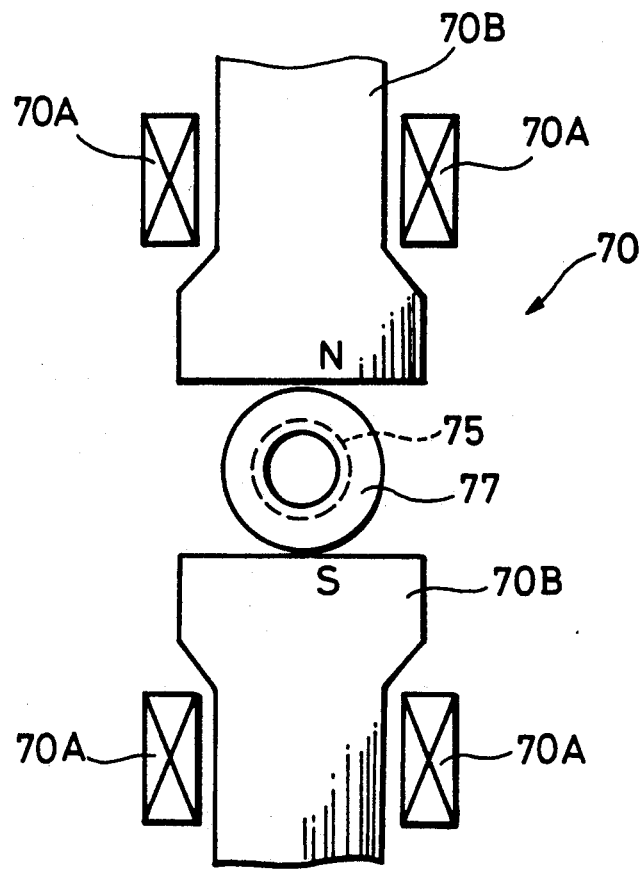
FIG. 14 is a schematic diagram showing an arrangement of a magnetizing device used in the fourth embodiment of the present invention.
Figure 15:
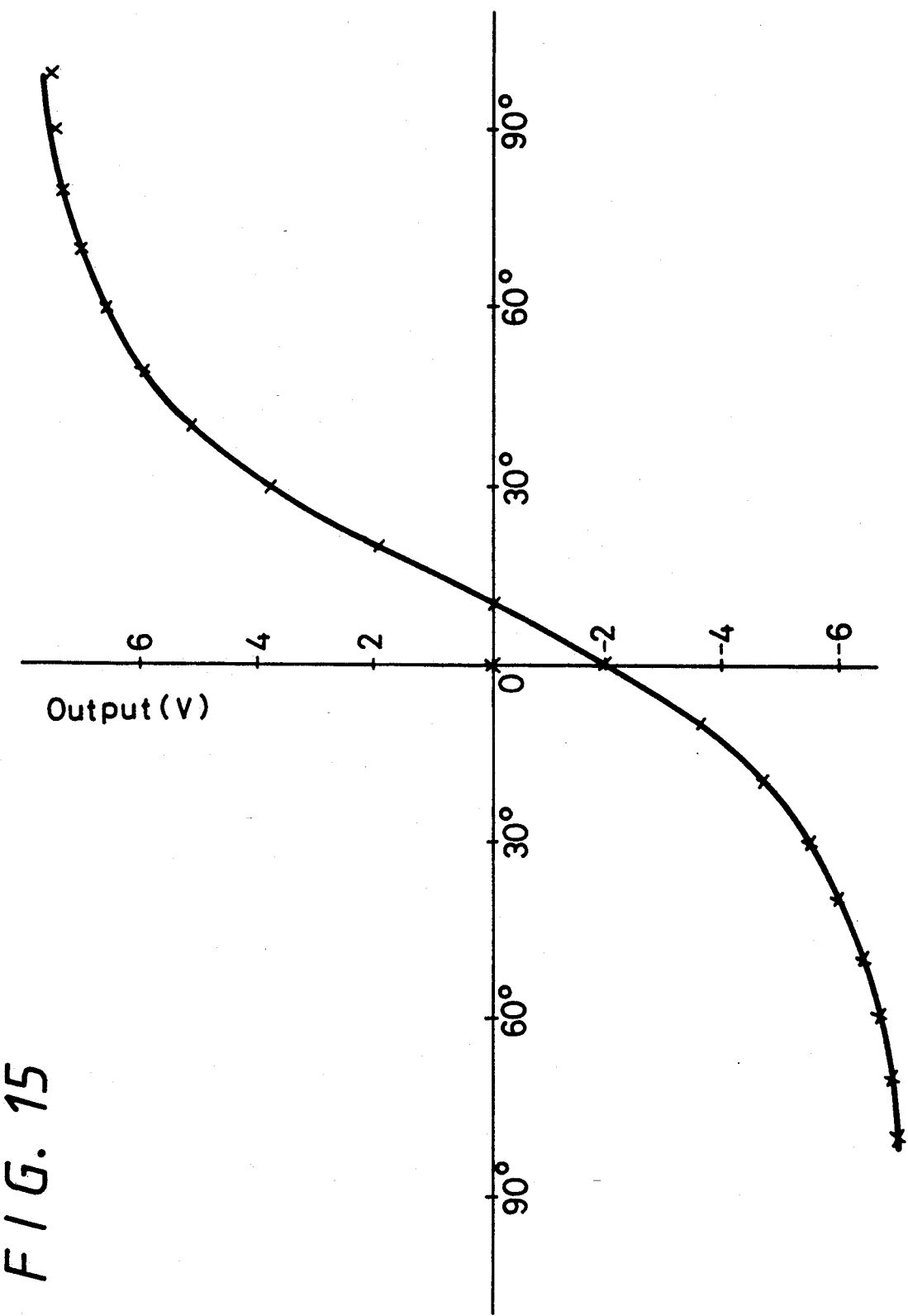
FIG. 15 is a cross sectional view taken through the line A—A in FIG. 12.

Referring to FIGS. 12 and 13, the angle detecting apparatus 70C is composed of a cylindrical iron casing 73, a cylindrical magnet holder 77 secured to the inner circumferential surface of the casing 73 and a magnet 75 secured to the magnet holder 77.

In this fourth embodiment, the magnet 75 is formed by wrapping a rubber magnet of 10 mm wide and 0.4 mm thick around a cylinderical brass magnet holder 77 about three times. The magnet 75 is magnetized such that the diametrical direction of the magnet holder 77 around which the rubber magnet (magnet) 75 is wrapped and secured is magnetized by a magnetizing device 70 having a pair of N and S poles, magnetizing device 70 has a solenoid 70A and a yoke 70B arranged so that the magnetized direction coincides with the direction in which N and S poles are magnetized—that is, the direction perpendicular to the axial direction of the casing 73.

Consequently, a magnetic field substantially parallel to the diametrical direction of the magnet holder 77 is formed in a space portion 77a inside the magnet holder 77. As shown in FIG. 12, within the space 77a, a holder 79 is located which houses a sensor coil 71, which is substantially the same as the coil 27 in FIG. 2. The coil 71 is located along the axis of the casing 73 so as not to contact the inner circumferential side surface of the magnet holder 77.

The sensor coil 71 functions as a magnetic sensor. The holder 79 is unitarily formed with a casing 79A which houses a detector circuit 79B. This detector circuit 79B is substantially the same as that shown in FIG. 3 and, therefore, need not be described further in detail.

In FIG. 1 the relation between the change of the rotational angle and the output voltage in this embodiment is illustrated. According to this fourth embodiment, the magnet 75 is wrapped around the outer circumferential surface of the holder 77 located inside the casing 73. The N and S poles of the magnet 75 are magnetized in the diametric direction of the casing 73 so that even when the coil 71 fluctuates in the diametric direction of the casing 73 due to vibration or the like, the detected output is kept high in accuracy. Furthermore, since this angle detecting apparatus detects the rotational angle in a noncontact fashion, this angle detecting apparatus can be made high in reliability.

Because the N and S poles of the rotatable magnet are magnetized in the direction perpendicular to the axial direction of the casing, the output signal from the magnetic sensor and the detecting circuit can accurately generate and produce an electrical signal corresponding to the relative rotational angle between the magnetic sensor and the magnet with high reliability and in noncontact fashion.

Figure 16:
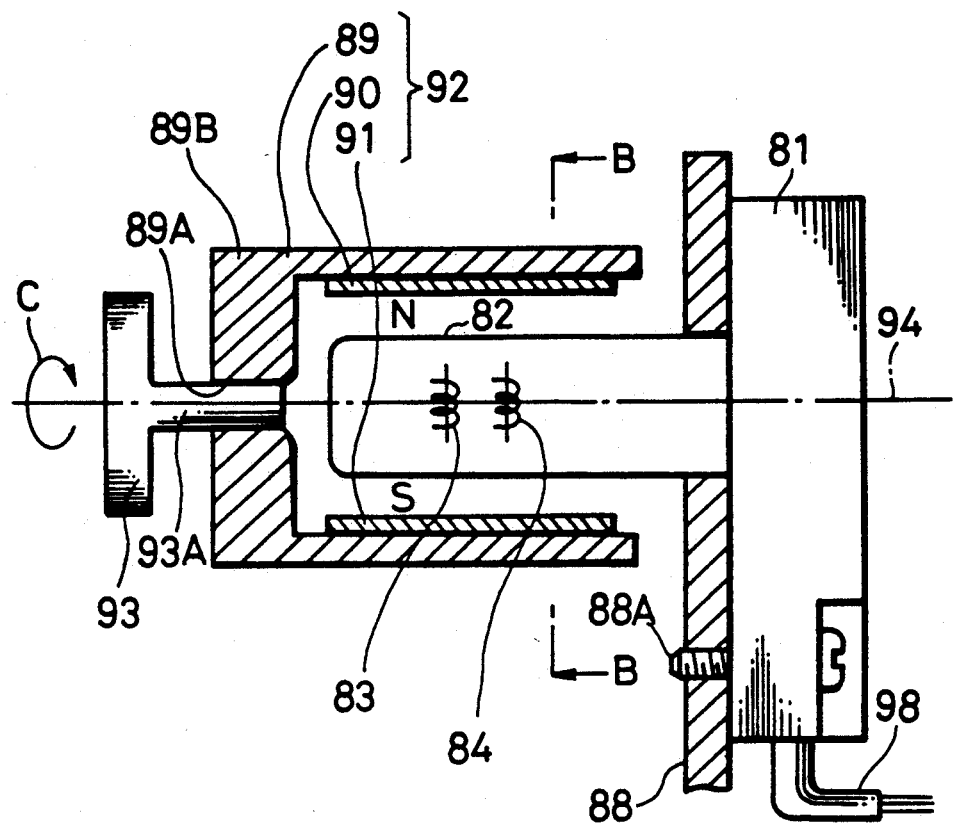
FIG. 16 is a side view of a fifth embodiment of the angle detecting apparatus according to the present invention and illustrating a mechanical relation between a magnetic field generating member and a saturable coil in a partly cutaway fashion.
Figure 17:
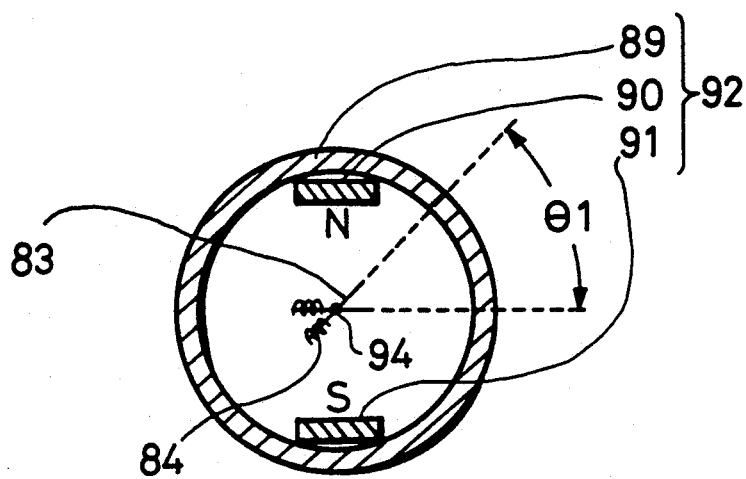
FIG. 17 is a cross sectional view taken along the line B—B in FIG. 16.

Referring to FIGS. 16 through 19, a fifth embodiment of the angle detecting apparatus according to the present invention is disclosed. As FIG. 16 shows, an angle detecting apparatus body 81 houses a detecting circuit which will be described later. The body 81 has a cylindrical supporting member 82 secured thereto, and a first coil (first magnetic sensor) 83 and a second coil (second magnetic sensor) 84 are secured within the supporting member 82 so as to be spaced from each other by an angle of substantially $\theta 1$ (in this fifth embodiment, $\theta = 60°$) as shown in FIGS. 16 and 17. The supporting member 82 is made of a non-magnetic material, e.g., SUS-304 or brass. The first and second coils 83, 84 are substantially the same as the coil 27 shown in FIG. 2 and, therefore, need not be described at this point in detail. Outputs of the first and second coils 83, 84 are respectively supplied to the detecting circuit.

As shown in FIG. 16, the body 81 is secured to a frame 88 by some suitable means such as a screw 88A. A cylindrical casing 89, one side 89B of which is closed, is located coaxially over the supporting member 82. Magnets 90, 91 are secured to the inner circumferential surface of the casing 89 so that N and S poles thereof are opened to each other diametrically across the central axis of rotation 94. Accordingly, a DC magnetic field is generated from the magnets 90, 91 to act on the first and second coils 83, 84. The casing 89 and the magnets 90, 91 constitute a magnetic field generator 92. The casing 89 is preferably made of a magnetic material but may be made of other materials.

As shown in FIG. 16, an axial hole 89A is formed through the bottom end 89B of the casing 89 and a shaft 93A fixed to a rotating member 93 whose rotational angle is to be measured such as an arm of working robot or the like, is secured in the hole 89A. Thus, the field generator 92 and the rotating member 93 being unitarily formed with each other are rotated about the axis 94 relatively to the first and second saturable coils 83, 84 in the direction shown by an arrow C in FIG. 16.

Figure 18:
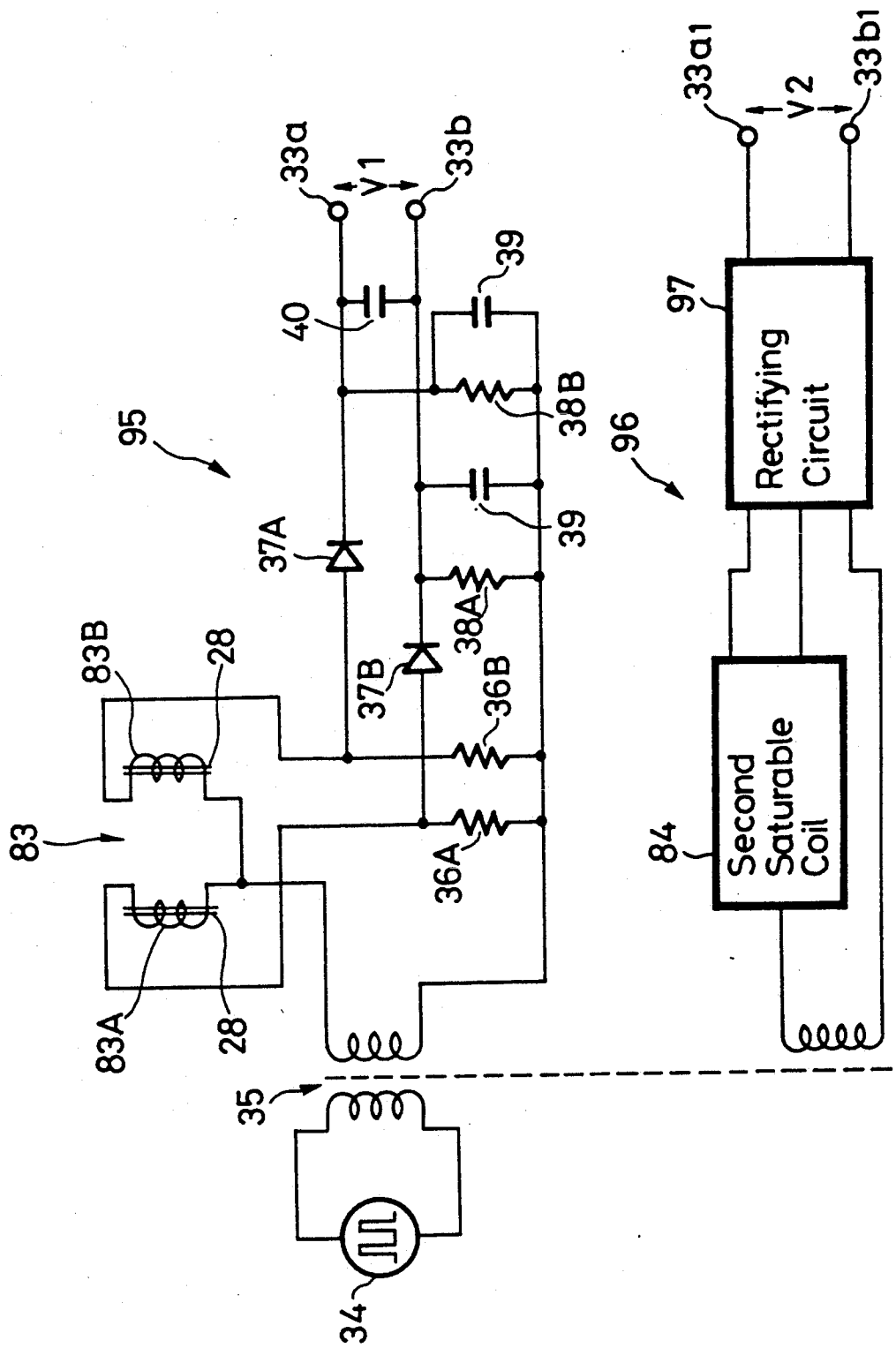
FIG. 18 is a schematic diagram showing the arrangement of the detecting circuits used in the fifth embodiment of the present invention.

As shown in FIG. 18, output terminals of the first and second coils 83, 84 are respectively connected to first and second detecting circuits 95, 96 substantially the same as the detecting circuits 32 shown in FIG. 3. The first and second detecting circuits 95, 96 are in circuit arrangement substantially the same as the detecting circuits 32 shown in FIG. 3. Therefore, for simplicity the circuit arrangement of only the first detecting circuit 95 will be described as will its coils 83A and 83B, respectively. The rest of the elements is the same as that of the first embodiment shown in FIG. 3.

The first detecting circuit 95 includes pulse-shaped voltage oscillator 34 which produces shaped pulses in a cycle of about 40 microseconds, each having a pulse width of about 1 microsecond and a voltage amplitude of about 30 Volts. The output of this oscillator 34 is supplied through the transformer 35 to the first and second coils 83, 84. In FIG. 18, references 36A, 36B denote series resistors, 37A, 37B diodes, 38A, 38B output resistors, and 39, 39 and 40 capacitors, generate an analog voltage output V1 across output terminals 33a and 33b.

The process in which the analog voltage output V1 is generated from the first detecting circuit 95 will be described in detail. The coils 83A, 83B are substantially magnetically saturated in the directions opposite to each other by the shaped pulses supplied from the oscillator 34. If a DC magnetic field is applied to the cores 28, 28 under this condition, then the inductance of one coil (e.g., saturable coil 83A) is increased while an inductance of the other coil (e.g., saturable coil 83B) is decreased. Then, when the shaped pulses supplied to the anodes of the diodes 37A, 37B are changed in response to the change of the inductance, rectifying voltages, produced in the output resistors 38A, 38B, are also changed. The rectifying voltages are changed in the directions opposite to each other so that a difference between the two rectifying voltages is produced as the output V1 of the first detecting circuit 95. This output V1 becomes a sine wave voltage corresponding to the relative rotation of the first saturable coil 83.

Also in the second detecting circuit 96, a sine wave voltage output V2 corresponding to the relative rotation of the second saturable coil 84 is developed across output terminals 33a1, 33b1 of a rectifying circuit 97. The phase of the output V2 is delayed by 60° from that of the output V1 because the first and second saturable coils 83, 84 are located at the angular distance of $\theta = 60°$ as shown in FIG. 17.

Figure 19:
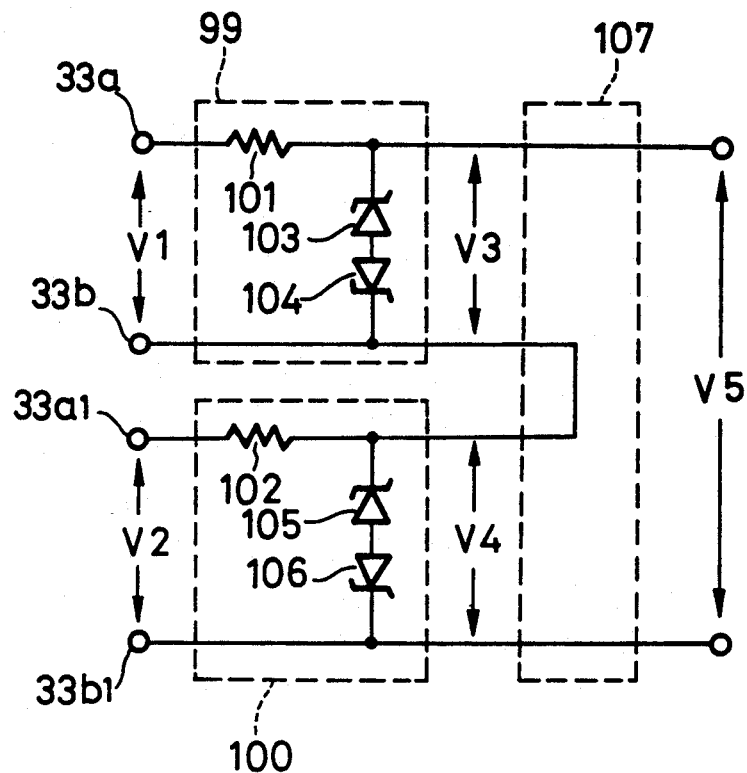
FIG. 19 is a diagram showing the arrangements of a limiter circuit and a synthesizing circuit used in the fifth embodiment of the present invention more in detail.
Figure 20:
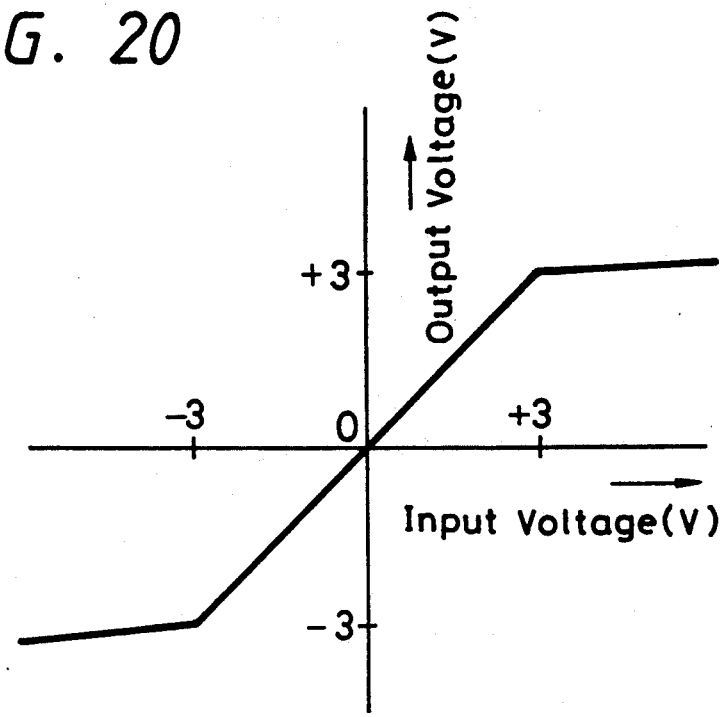
FIG. 20 is a characteristic diagram showing a characteristic of the limited circuit shown in FIG. 19.

The voltage outputs V1, V2 of the first and second detecting circuits 95, 96 are supplied through a multi-core shielding line 98 (see FIG. 16) to first and second limiter circuits 99, 100 shown in FIG. 19. The first and second limiter circuits 99, 100 respectively include resistors 101, 102 and Zener diodes 103, 104, and 105, 106 which are opposite in polarity. The input and output characteristics of the first and second limiter circuits 99 and 100 shown in FIG. 19 are represented in the diagram of FIG. 20, in which the output voltage is rectilinearly changed when the input voltage falls within ±3 (V) which is the limiter voltage and is restricted by the voltage higher than the limited voltage. This characteristic is determined by the Zener voltages of the Zener diodes 103 to 106 and the forward-biasing voltage applied thereto.

Outputs V3, V4 of the first and second limiter circuits 99, 100 are synthesized by a circuit 107 as a synthesized output V5.

Figure 21:
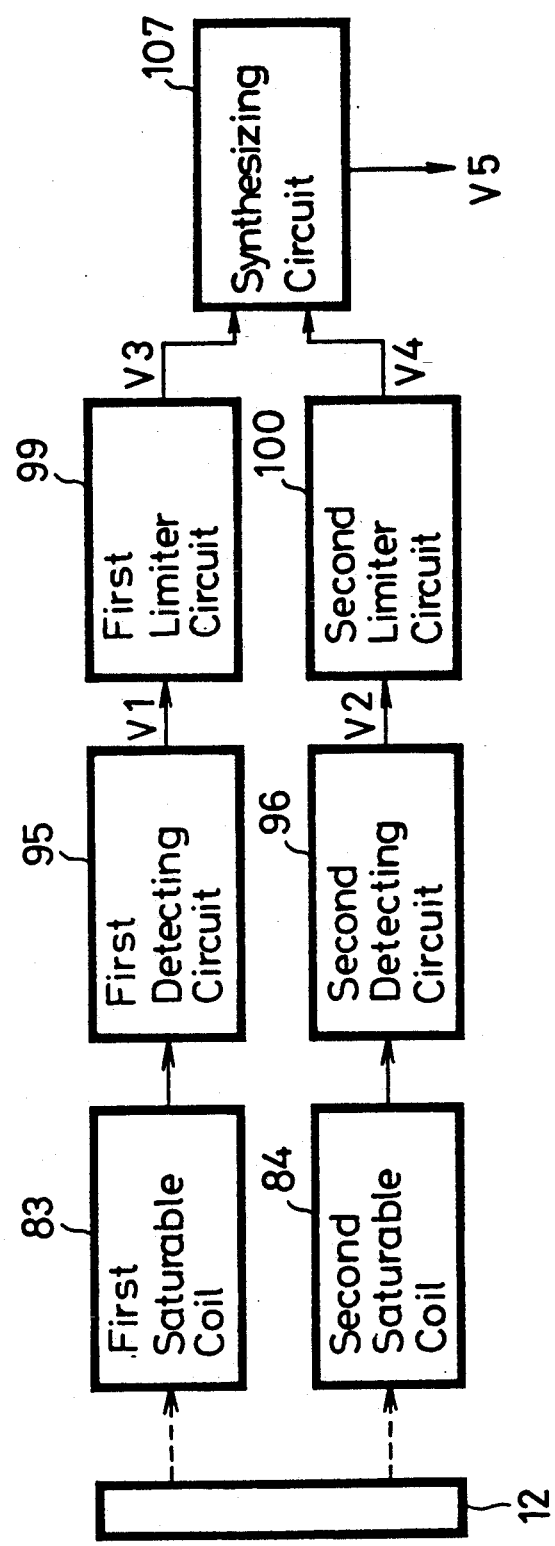
FIG. 21 is a block diagram showing the arrangement of the angle detecting apparatus according to the fifth embodiment of the present invention.

FIG. 21 shows, in block form, the overall arrangement of the angle detecting apparatus according to the fifth embodiment of the present invention, the respective elements of which have already been described.

When the magnetic field generator 92 is rotated about the axis 94 in the direction shown by the arrow C, due to the rotation of the measured rotating member 93, the first and second saturable coils 83, 84 are rotated relatively to the magnetic field generating member 92.

An angle in which the magnetic line of force generated by the magnets 90, 91 and the first and second saturable coils 83, 84 cross each other is changed by this rotation. Then, the inductances of the saturable coils 83A (84A) and 83B (84B) are changed. The changes of the inductances are supplied to the first and second detecting circuits 95, 96. The outputs are obtained as sine wave signals of ±6 Volts (peak to peak) which are different in phase by 60° as shown in FIG. 22A.

The outputs V1, V2 are waveform-shaped becoming outputs V3, V4 of trapezoidal wave signals which are limited to ±3 Volts by the first and second limiter circuits 99, 100 (see FIGS. 22B, 22C). The outputs V3, V4 are added by a synthesizing circuit 107 as an added output V5 of trapezoidal wave. The wave form of this output V5 is illustrated in FIG. 22D. The added output V5 results from adding the first and second sign wave signals V3, V4 in an angular range of 0°±30° which can be approximated to straight lines. Thus, a proportional output (straight line approximated area) can be obtained relative to the rotation of the measured rotating member 93 in a range of from −30° to +90° (in a range of 120°) and in a range of ±60° across the center.

In the fifth embodiment of the present invention, the outputs V1 and V2 are added in a ranges of ±30°. If the circuit is modified such that the outputs V1 and V2 are added in a range of ±45°, then the straight line approximation area can be widened as ±90° (in a range of 180°).

Generally, the angular range in which the output proportional to the angle of the sine wave is ±45° (in an angular range of 90°). According to the fifth embodiment of the present invention, it is possible to obtain the straight line area in an angular range over 90°.

The synthesizing circuit 107 of the fifth embodiment of the present invention is formed by serially connecting the first and second limiter circuits 99, 100 which derive the outputs V3 and V4. The reason that the first and second limiter circuits 99, 100 are connected in series to form the synthesizing circuit 107 without modification is that the first and second limited circuits 99, 100 are insulated from each other by the transformer 35. If the first and second limiter circuits 99, 100 are not insulated, then the synthesizing circuit 107 may be an adder utilizing an operational amplifier.

As set out above, according to the angle detecting apparatus of the fifth embodiment of the present invention. The outputs of the first and second relatively rotating magnetic sensors are detected by the detecting circuits, and thereby the first and second sine wave signals are obtained. These first and second sine wave signals are limiter-processed so as to obtain the synthesized output, and this synthesized output becomes the signal of substantially trapezoidal wave which results from synthesizing the portions approximated by the straight lines of the first and second sine wave signals. Therefore, even in the rotational angle over 90°, the proportional output can be obtained in response to the rotational angle.

Having described the preferred embodiments of the invention with reference to the accompanying drawings, it is to be understood that the invention is not limited to those precise embodiments and that various changes and modification thereof could be effected by one skilled in the art without departing from the spirit or scope of the novel concepts of the invention as defined in the appended claims.

I claim:

1. Apparatus for detecting the angle of a rotating object comprising:
   (1) magnetic field generating means fixed to said object;
   (2) first and second magnetic sensor means located in the magnetic field generated by said magnetic field generating means for respectively generating first and second outputs corresponding to the rotation of said object, said first and second magnetic sensor means being located separate from each other and directed to intersect at a predetermined angle;
   (3) first and second detecting means for generating first and second sine wave signals in response to the outputs respectively from said first and second magnetic sensor means, said first and second sine wave signals being different in phase;
   (4) first and second limiter means for respectively limiting said first and second sine wave signals from said first and second detecting means so that said first and second sine wave signals have portions which are increased and decreased linearly to provide first and second trapezoidal waves; and
   (5) synthesizing means for synthesizing the outputs from said first and second limiter means to obtain a third trapezoidal wave output indicative of the rotation angle of said object relative to said first and second magnetic sensor means, the angular range of each of the linearly increasing and decreasing portions of said third trapezoidal wave output being substantially twice that of each of said first and second trapezoidal waves.

2. The apparatus according to claim 1, wherein said magnetic field generating means comprise a pair of magnets so located that N and S poles are opposed to each other and in a parallel fashion.

3. The apparatus according to claim 1, wherein said magnetic field generating means includes a cylindrical case and a cylindrical magnet attached to the inner surface of said cylindrical case in such a manner that N an S poles of said cylindrical magnet are opposed to each other in a direction perpendicular to the central axis of said cylindrical case.

4. The apparatus according to claim 1 in which the predetermined angle of the intersecting magnetic sensor means is 60 degrees.

* * * * *